United States Patent

[11] 3,566,827

| [72] | Inventors | Francis L. Moseley<br>Pasadena;<br>Peter Moseley; Glenn A. Johnson,<br>Altadena, Calif. |
|---|---|---|
| [21] | Appl. No. | 706,586 |
| [22] | Filed | Feb. 19, 1968 |
| [45] | Patented | Mar. 2, 1971 |
| [73] | Assignee | Servo Products Company |

[54] POSITION INDICATOR FOR MACHINE TOOLS
9 Claims, 14 Drawing Figs.

[52] U.S. Cl. ................................................ 116/115.5,
74/812, 90/21, 235/117
[51] Int. Cl. ............................................... B23q 17/00
[50] Field of Search ........................................ 116/115.5,
133, 115; 235/103, 154; 33/125; 90/37, 21;
74/681 (Inquired), 812, 815

[56] References Cited
UNITED STATES PATENTS

| 1,608,606 | 11/1926 | McNab | 235/103 |
|---|---|---|---|
| 1,760,938 | 6/1930 | Edgar | 116/115X |
| 2,692,085 | 10/1954 | Gibbs | 235/103 |
| 2,914,153 | 11/1959 | Krause et al. | 116/115.5X |
| 3,048,832 | 8/1962 | Fitzner | 235/103X |
| 3,097,793 | 7/1963 | Mitchell et al. | 235/103X |
| 3,315,633 | 4/1967 | Rabinow | 116/115.5 |
| 3,339,427 | 9/1967 | Moseley | 74/848 |
| 499,929 | 6/1893 | Perrigo | 74/812 |
| 1,736,064 | 11/1929 | Walker | 74/812 |
| 2,505,841 | 5/1950 | Shuker et al. | 74/812 |

*Primary Examiner*—Louis R. Prince
*Assistant Examiner*—Daniel M. Yasich
*Attorney*—Fraser and Bogucki ABSTRACT: A reversible bidirectionally operable position indicator, driven by a lead screw, for example, is provided for showing the accumulated displacement of a workpiece to either side of a reference point. A coarse reading of displacement is furnished by a resettable counter driven in a selected direction by a transmission coupled to the lead screw and having a bidirectional output. A fine reading of displacement is provided by a manually adjustable vernier scale cooperating with a reference scale driven by the lead screw. A gearing arrangement may be utilized for obtaining indicator readings, selectively, in either the English or metric system.

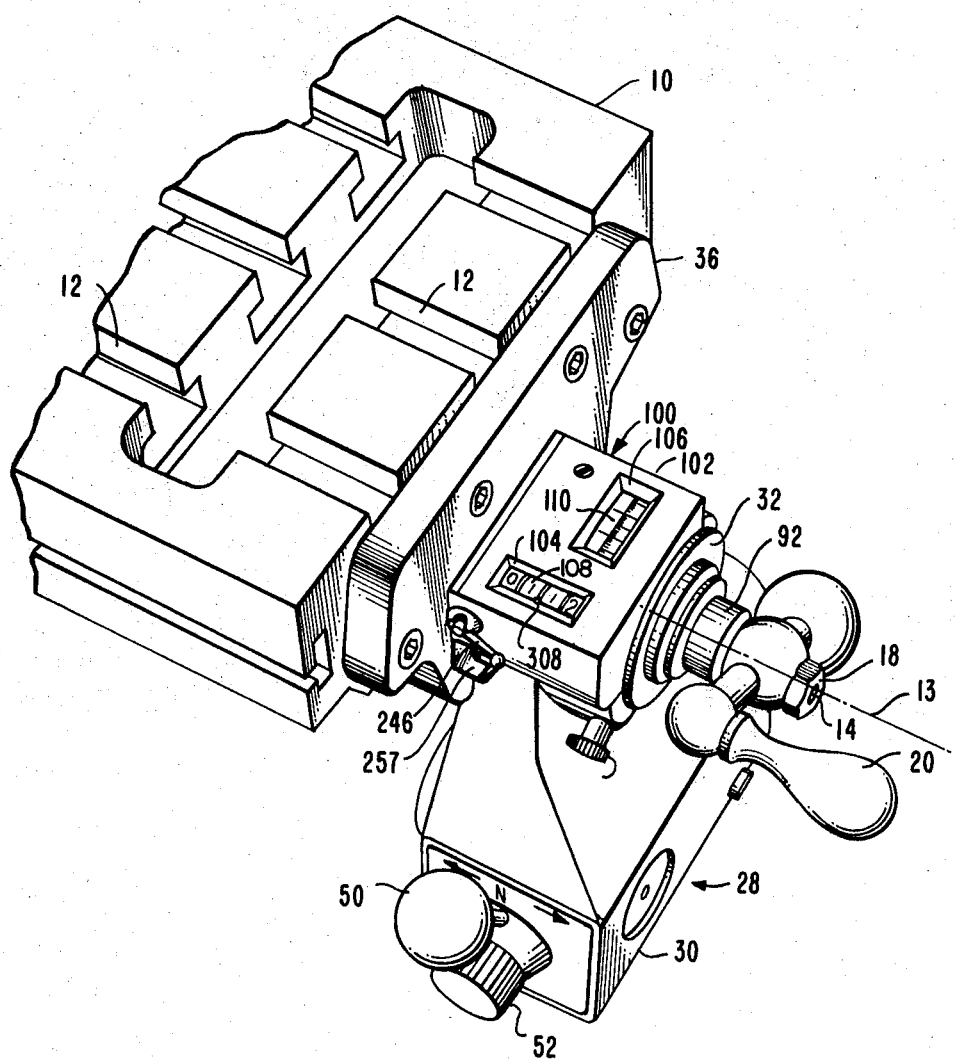
FIG.—1

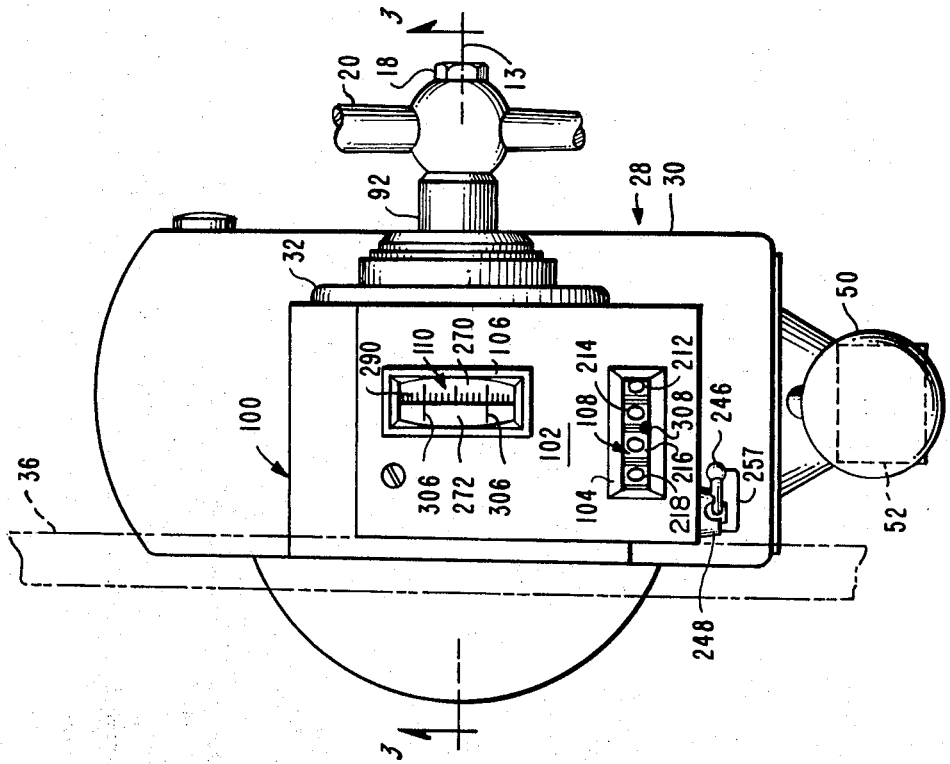
FIG.—2
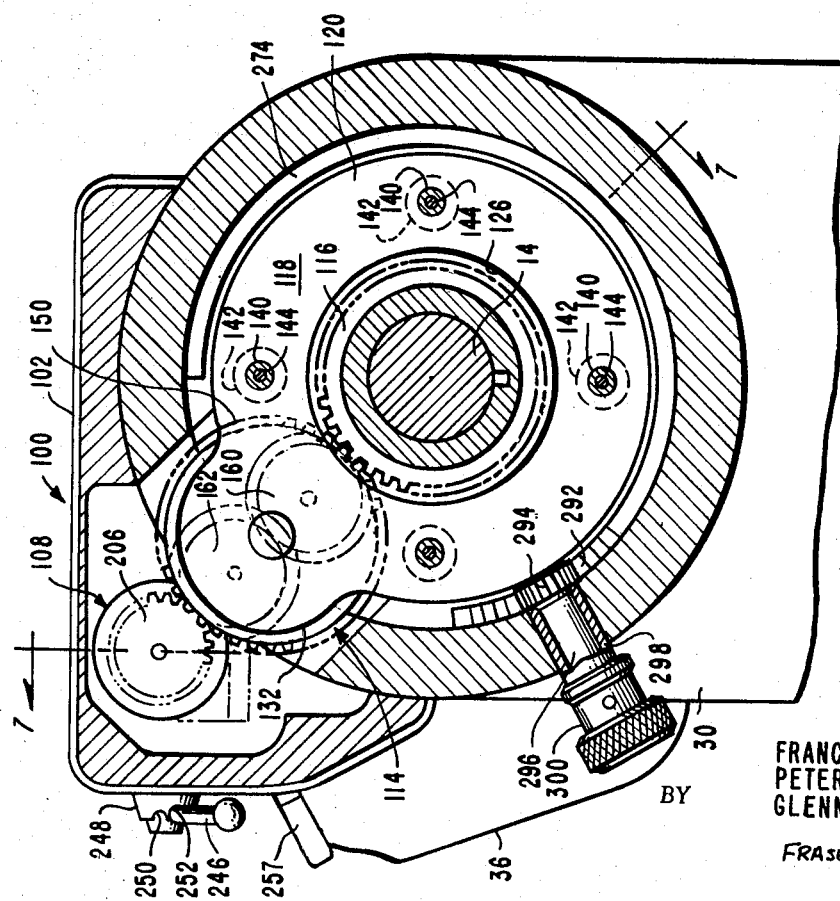
FIG.—4
INVENTORS
FRANCIS L. MOSELEY
PETER MOSELEY
GLENN A. JOHNSON
BY FRASER & BOGUCKI
ATTORNEYS

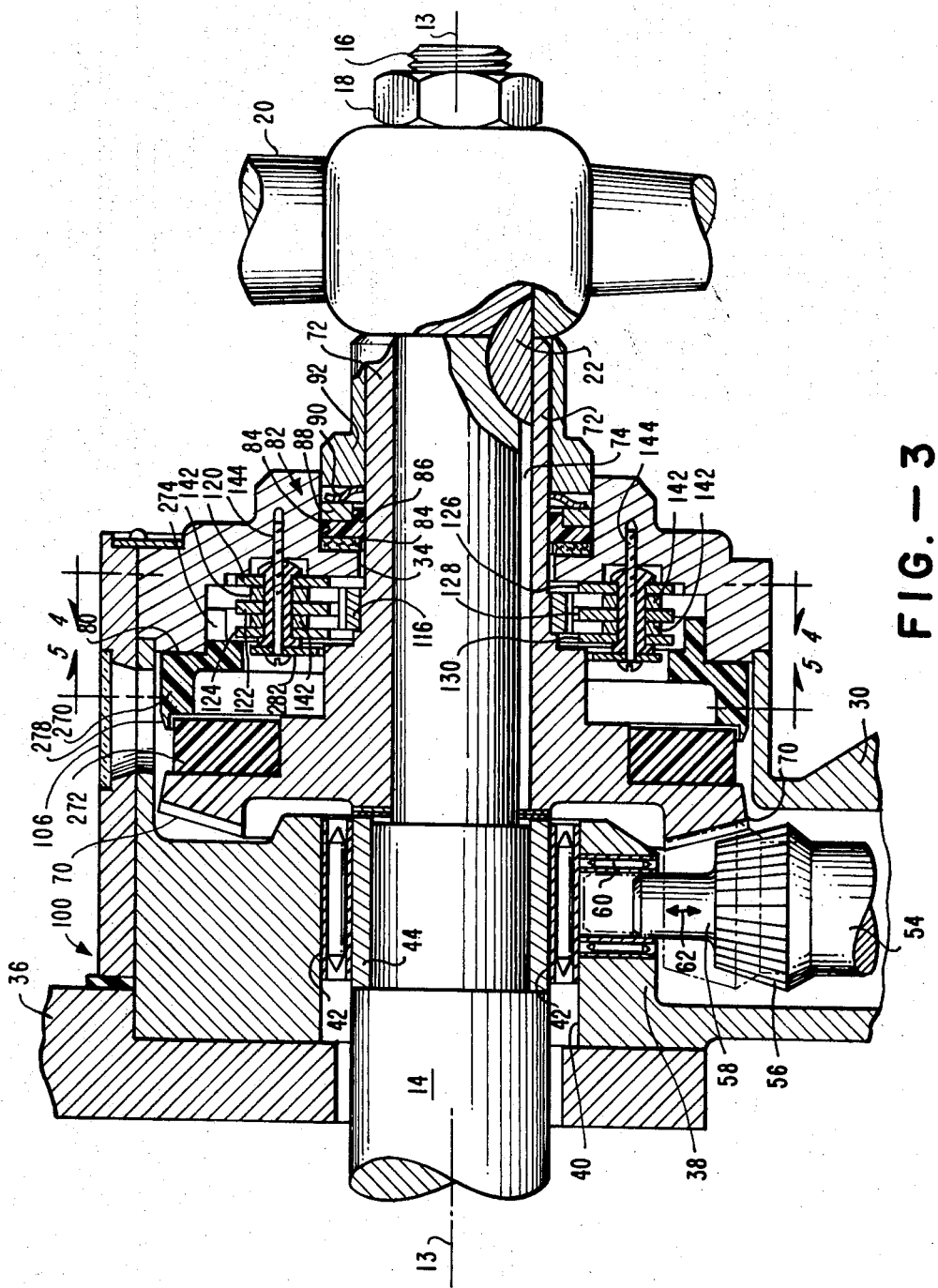

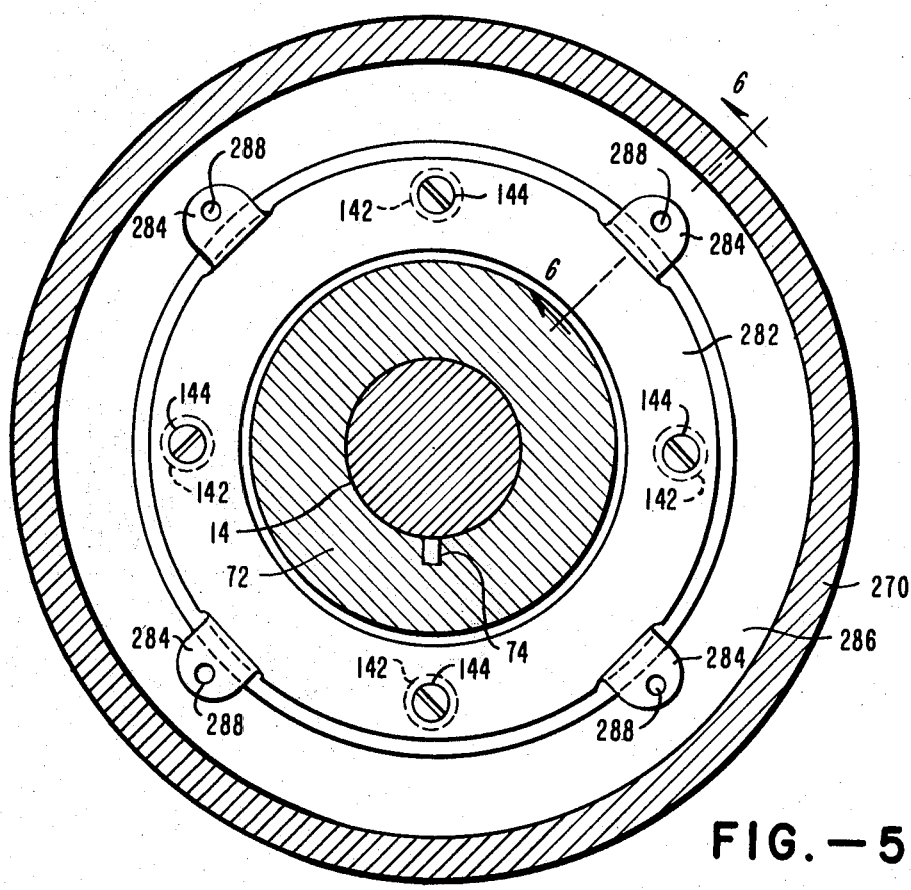
FIG.—5
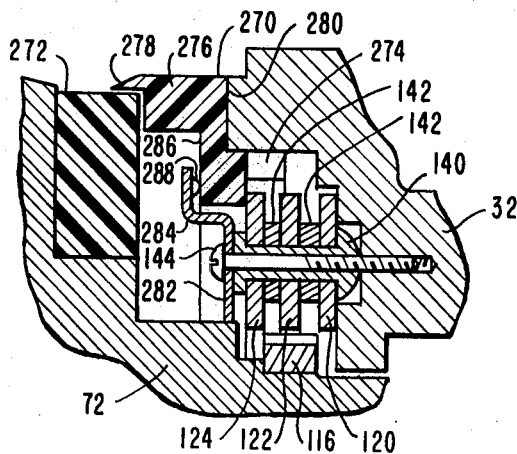
FIG.—6

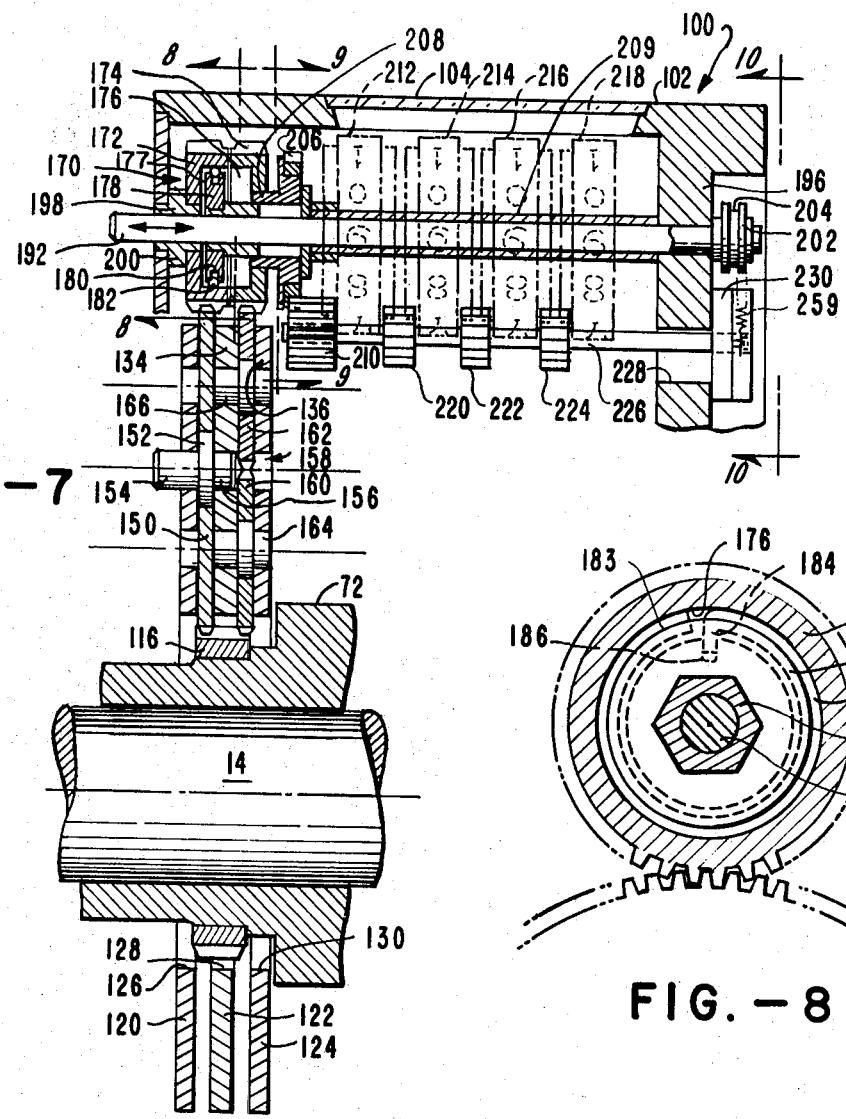

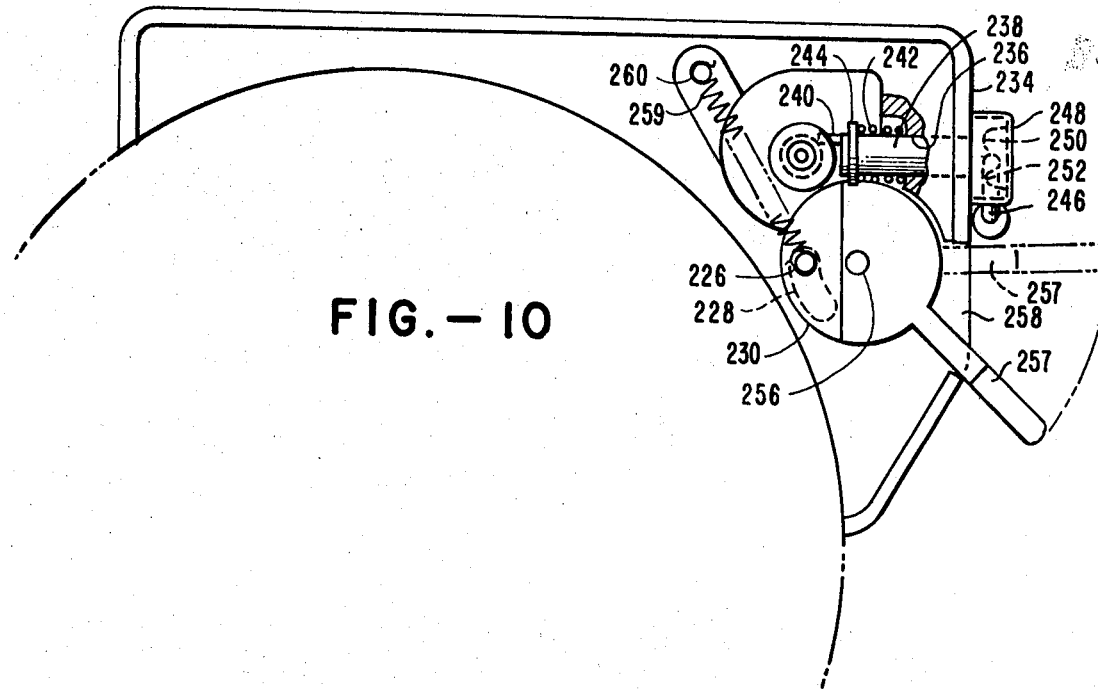
FIG.—10
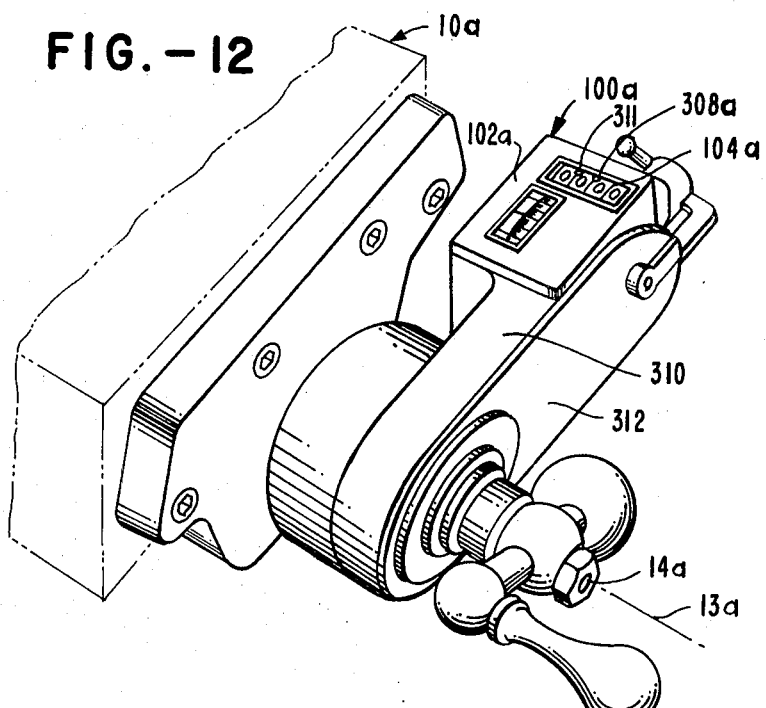
FIG.—12
INVENTORS
FRANCIS L. MOSELEY
PETER MOSELEY
GLENN A. JOHNSON
BY FRASER & BOGUCKI
ATTORNEYS

PATENTED MAR 2 1971

INVENTORS
FRANCIS L. MOSELEY
PETER MOSELEY
GLENN A. JOHNSON

BY FRASER & BOGUCKI

ATTORNEYS

POSITION INDICATOR FOR MACHINE TOOLS

BACKGROUND OF THE INVENTION

This invention relates generally to position or displacement indicators for use with the mechanical drives of machine tools, and particularly to indicators for providing a cumulative reading of displacement, to either side of an arbitrary reference point, of work being processed by machine tools.

In a variety of machine tools, the position of a workpiece relative to a cutting or forming tool is controlled by some sort of feed mechanism, either manual or power. One such machine tool, and to which the present description will be primarily directed by way of example, is the milling machine in which the workpiece is fastened to a table adapted to be displaced relative to a cutter mounted on a rotating spindle. Longitudinal and transverse lead screws mounted for rotation by a handwheel or a power drive means are provided for moving the table and hence the workpiece in orthogonal directions with respect to the cutting tool.

A problem arising out of the use of tools such as the milling machine, in which positioning is accomplished by lead screw mechanisms, is the accurate determination of the location of the workpiece relative to the cutter. Conventional position indicators for lead screw drives comprise a graduated scale or dial coupled to rotate with the lead screw relative to a reference mark. Although these devices may be quite accurate within each revolution of rotation of the lead screw, they do not provide a cumulative indication. Thus, the machinist much count and remember the number of complete revolutions of the lead screw in order to keep track of the exact position of the workpiece relative to the cutting tool. Should the machinist be interrupted or lose count, succeeding cuts may be incorrectly positioned by a distance corresponding to one or more turns of the lead screw. Many workpieces are ruined by machinist errors of this type. Sometimes a machinist will affix a tape measure or rule to the front of the table and scratch a reference mark on the fixed portion of the machine adjacent the rule. This provides the machinist with a coarse indication of table position, the fine measurement being provided by the graduated dial. The machinist, however, is required to move back and forth between two locations to obtain his measurement. In addition to this inconvenience, tape measures and rulers normally read in one direction only.

Another disadvantage of position indicators presently is use is that they are unidirectional, that is, they only measure in one direction, usually that direction corresponding to clockwise rotation of the lead screw. If the table direction is reversed, that is, the lead screw rotated counterclockwise, the machinist must be continuously aware of table position and either mentally, or on paper, make the appropriate calculations to locate his work in accordance with the dimensions specified on the blueprint. This increases the possibility of errors, not only of an arithmetic nature, but of the type resulting from a failure to keep track of numerous manipulations of the lead screw drives.

Another problem of present position indicators is the clutching or locking arrangement employed to engage and disengage the graduated dial. This mechanism permits repositioning of the dial independently of the table drive. Typically, a locknut is provided which, when tightened, clamps the dial so that it turns with the lead screw. The locknut is disposed in the confined space between the dial and the lead screw handwheel, and when the locknut is loosened to reposition the dial and then tightened, a great deal of care must be exercised to prevent accidental turning of the handwheel. Often, because of the torque required to tighten or loosen the locknut, it is virtually impossible to avoid disturbing the lead screw position when manipulating the locknut.

Today, an increasing amount of industrial fabrication is done in metric system units. Because practically all machines in use today in the U.S. have drives and graduated scales manufactured and calibrated in accordance with the English measure measuring system, means for converting from the English system of units to the metric system without having to resort to cumbersome conversion tables have become a necessity. Presently available conversion devices are not only expensive and sometimes inconvenient to use, but have some of the same disadvantages discussed above — thus, for example, they are noncumulative and unidirectional in operation.

BRIEF SUMMARY OF THE INVENTION

Broadly, one aspect of the present invention provides apparatus for indicating the position of a member selectively movable by a bidirectional drive means and includes a digital indicating means for numerically displaying the accumulated displacement of the member to either side of a selected reference point. A transmission means, coupled to the drive means and having bidirectional outputs, actuates the indicating means through a coupling which may be selectively positioned to connect the indicating means to one or the other of the transmission outputs. Used in conjunction with both the longitudinal and transverse drive means of the machine tool, the machinist is furnished with a cumulative reading of table displacement from a selected reference point and has access to all quadrants with minimum inconvenience insofar as translating blueprint dimensions to workpiece movement is concerned.

In accordance with another broad aspect of the invention, used in conjunction with the digital indicating means described immediately above, a vernier means is provided for indicating fine increments of displacement. The vernier means includes a reference dial connected to be driven by the drive means and has an outer surface with a series of equally spaced lines. A manually adjustable vernier dial is disposed adjacent the reference dial and has an outer surface with a series of markings forming a bidirectional scale which cooperates with the reference dial markings to provide fine readings of displacement.

Another feature of the invention broadly contemplates a transmission means the drive means and the displacement indicators to convert measurements in the English system to the metric system and selectively provide displacement indications in either the English or metric system.

According to one specific form of the invention, for use with the lead screw table drive of a milling machine, a resettable digital counter for displaying the accumulated displacement of the table from the starting or reference point is utilized. The counter is driven by a gear train coupled to the milling machine table lead screw and has counterrotating outputs. A manually actuatable clutch mechanism permits selection of one or the other gear train outputs to advance the counter for indicating total displacement of the table in either direction from the reference. The foregoing apparatus may be utilized to give a coarse reading of table displacement, for example, to the nearest .01 inch. Fine indications of table displacement are provided by vernier means including a reference dial mounted directly on the lead screw to be rotatable therewith and having an outer surface provided with circumferentially spaced markings placed at equal intervals. A vernier dial is disposed immediately adjacent and coaxial with the reference dial and is provided on its outer surface with a bidirectional scale for reading in one direction or the other to the nearest .001 inch, for example. The vernier dial is manually adjustable so that its position may be altered to bring the bidirectional scale into alignment with the markings on the surface of the reference dial. To convert measurements of table movement into the metric system, the counter and the vernier indicators are driven through a suitable gear train. This gear train parallels a second gear train and through a clutch arrangement, the operator can select which gear train is to drive the counter and vernier, thereby providing readings in either the English or metric system.

BRIEF DESCRIPTION OF THE DRAWINGS

Other objects and advantages of the present invention will become apparent from a reading of the detailed description, below, in connection with the drawings in which:

FIG. 1 is a perspective view of a portion of a milling machine table and feed mechanism with a position indicator of the present invention installed;

FIG. 2 is a fragmentary plan view of the position indicator of FIG. 1;

FIG. 3 is a longitudinal, elevation view, in section, of the apparatus shown in FIG. 2 taken along the plane 3–3;

FIG. 4 is a transverse sectional view of the apparatus of FIG. 3 taken along the plane 4–4;

FIG. 5 is a transverse sectional view of the apparatus of FIG. 3 taken along the plane 5–5;

FIG. 6 is a fragmentary sectional view of the apparatus as shown in FIG. 5 taken along the plane 6–6;

FIG. 7 is a longitudinal sectional view of the apparatus as taken along the plane 7–7 as shown in FIG. 4;

FIG. 8 is a transverse sectional view of a portion of the counter mechanism taken along the plane 8–8 in FIG. 7;

FIG. 9 is a transverse sectional view of a portion of the counter mechanism taken along the plane 9–9 in FIG. 7;

FIG. 10 is a rear view of the counter mechanism as seen along the plane 10–10 in FIG. 7;

FIG. 12 is a perspective view of a milling machine table drive mechanism having an offset table position indicator for showing table displacement in terms of either English or metric units;

DETAILED DESCRIPTION

Figure 11:
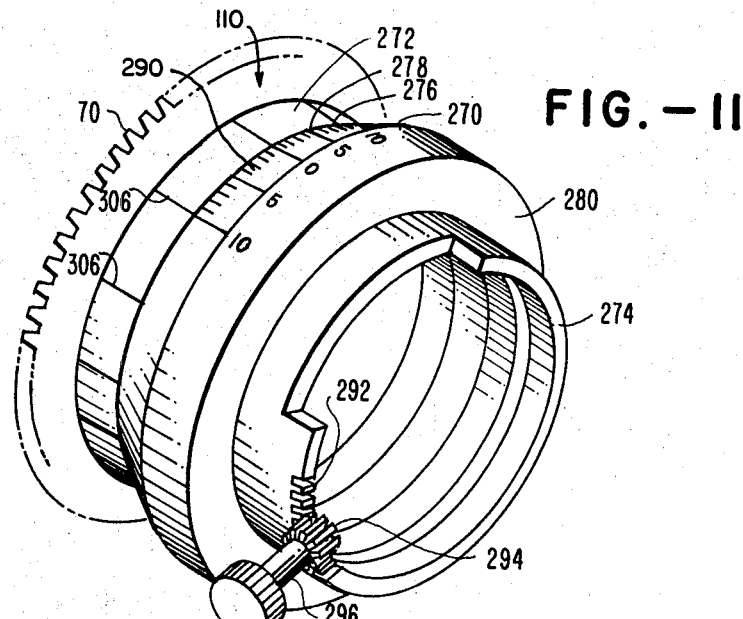
FIG. 11 is a perspective view of the bidirectional vernier indicator mechanism.

Referring to FIGS. 1—3, the machine illustrating the present invention is a milling machine having a table 10 provided with T-slots 12 adapted to receive clamping means (not shown) for holding the work to be shaped. The table 10 and the attached workpiece are displaced longitudinally and transversely relative to the cutter by lead screws connected to and cooperating with the table 10 in a manner well known to those skilled in the art. The apparatus of the present invention may be utilized with either or both longitudinal and transverse lead screw drives. Because the installation is generally the same for both longitudinal and transverse drives, the device of the present invention will only be discussed with respect to the longitudinal drive, by way of example.

The longitudinal lead screw has a longitudinal axis 13 and a stepped end shaft 14, concentric with the axis 13, projecting from one end of the table 10. At its outer extremity, the lead screw shaft 14 is provided with threads 16 which, is in cooperation with a nut 18, serve to hold a crank or handwheel 20 on the end of the shaft 14. As shown in FIG. 3, a Woodruff key 22 engages slots in the hub of the handwheel 20 and in the shaft 14 to prevent relative rotation between the hand wheel 20 and shaft 14. By rotating the handwheel 20, the operator can manually position the work with respect to the milling machine cutter in the longitudinal direction. Typically, the pitch of the lead screw threads is such that one revolution of the handwheel 20 causes a linear table displacement of .200 inch, with clockwise rotation of the handwheel 20 resulting in table movement toward the left (as viewed in FIG. 1), and counterclockwise rotation providing movement to the right.

A selectively operable feed mechanism 28 may be provided to move the table 10 by electrical power. The structural details and operation of a power table feed mechanism which may be used is disclosed in U.S. Pat. No. 3,339,427, issued on Sept. 5, 1967 to F. L. Moseley, one of the joint inventors herein. Because such power feed does not form a part of the present invention, and its use therewith is optional, only a brief description will be set forth.

Generally, the power feed mechanism 28 includes a casing 30 having an upper, generally cylindrically shaped portion concentric with the axis 13 and adapted to enclose the lead screw shaft 14. As best shown in FIG. 3, the casing 30 has a generally cylindrical end cap 32 having a central bore 34, coaxial of the axis 13 and through which the lead screw shaft 14 projects. The casing 30 is attached to the end of the milling machine table 10 by means of a an adapter plate 36. Inside the casing 30, a boss 38 projects forwardly (that is, to the right, as viewed in FIG. 3) from the rear wall of the casing and has a horizontal bore 40 concentric with the axis 13. A needle bearing 42 having an inner race 44 disposed about the shaft 14, is retained within the bore 40 and forms a substantially frictionless support for the shaft 14.

Mounted inside the casing 30 is a reversible motor whose direction and speed are controlled by a lever 50 and a potentiometer knob 52, respectively. The direction control lever 50 is moved to the left or to the right of a central, neutral position to provide table movements to the left or right as viewed in FIG. 1. In the neutral position, the power feed is disengaged from the lead screw shaft 14, thereby permitting manual displacement of the table 10 by the hand wheel 20. The potentiometer knob 52, used to select motor speed, determines the linear feed rate of the table 10.

Referring specifically to FIG. 3, the bidirectional motor drives a vertically oriented gear shaft assembly 54 provided at its upper end with a bevel gear 56 and an upwardly projecting stub shaft 58 coaxial of the shaft 54. The stub shaft 58 rides within, and is laterally supported by, a needle bearing 60 mounted in a vertical bore formed in the boss 38 of the casing 30. The stub shaft 58 is dimensioned for a sliding fit within the inner race of the needle bearing 60 to permit vertical, reciprocating movement of the gear shaft assembly 54, as shown by the arrow 62. As described in detail in the referenced U.S. Pat. No. 3,339,472, when the feed direction control lever 50 is in either the left or right-hand drive positions, the gear shaft 54 is in its uppermost position, as shown by the broken lines in FIG. 3. In this position, the bevel gear 56 meshes with a bevel ring gear 70 made integral with, or suitably mounted upon, a generally tubular, forwardly projecting hub 72. The hub 72 has an internal, longitudinally extending keyway 74 engaged by the key 22 so that the hub 72, the lead screw shaft 14 and the handwheel 20 rotate together as a unit. In this way, the lead screw shaft 14 is driven in one direction or the other by the gear shaft assembly 54 when the shaft assembly is in its upper position. In the lowermost position of the gear shaft assembly 54, depicted by the solid lines in FIG. 3, the control lever 50 is in the neutral position, the bevel gear 56 and bevel ring gear 70 are out of engagement and the table 10 may be hand fed without interference.

A cylindrical recess 80, formed in the front portion of the end cap 32, houses suitable packing or sealing means 82 disposed about the rotatable hub 72. Various sealing means will suggest themselves to those skilled in the art. In the example of FIG. 3, the sealing means 82 includes a hard fiber washer 84 in engagement with the shoulder of recess 80, a deformable oil seal 86 bearing against forward surface of the washer 84 and a metal backup ring 88 seated within an annular recess formed in the front face of the oil seal 86. The oil seal 86 is compressed and deformed to make sealable contact with the hub 72 by a wavy washer spring 90 interposed and partially compressed between the backup ring 88 and a seal bushing 92 mounted on the forward extremity of the hub 72.

Mounted on top of the casing 30 is a table position indicator mechanism 100, which forms the subject matter of the present invention and provides the operator with an accurate indication of table displacement in either direction from an arbitrary zero or reference point. In the example shown in the drawings, specifically FIGS. 1 and 2, the table position indicator mechanism 100 includes a housing 102 having a planar top surface with windows 104 and 106. The operator observes, through window 104, a digital indicator, in the form of a counter 108, which shows table displacement or position to the nearest .010 inch, for example. This may therefore be considered as providing a coarse reading of table displacement or position. A fine reading of table displacement, to the nearest .001 inch, for example, is provided by a vernier device 110, observable through window 106.

The counter 108 and the vernier device 110 are actuated by the bevel ring gear hub 72, as best shown in FIGS. 3—11. The counter 108 is driven by a gear transmission 114 having a bidirectional output. The transmission 114 includes a spur gear 116 having a relatively wide face and suitably affixed to the hub 72, and a gear plate assembly 118 comprising three substantially identical, spaced, parallel gear plates 120, 122 and 124. As shown in FIGS. 3 and 4, the gear plates 120, 122 and 124 are generally ring shaped, having central openings 126, 128 and 130, respectively, which are in alignment and coaxial of the lead screw axis 13. The plates 120, 122 and 124 are provided with rounded projecting portions 132, 134 and 136. The gear plate assembly 118 is held together by a set of four rivets 140, each passing through aligned holes formed in the plates 120, 122 and 124. Flat washers 142 interposed between the plates about the rivets 140 maintain the plates 120, 122 and 124 in the proper spaced-apart, parallel relationship. The gear plate assembly 118 is securely fastened to the end cap 32 by machine screws 144 passing through axially oriented holes in the rivets 140.

As best shown in FIGS. 4 and 7, the gear plates 120 and 122 support between them a single idler gear 150, which will be designated arbitrarily as the forward idler gear. The gear 150 rotates about a central pivot 152 having forwardly and rearwardly projecting hubs 154 and 156, respectively, carried by aligned apertures formed in the plates 120 and 122.

A reverse gear train 158 is carried between the gear plates 122 and 124. The train 158 consists of a first idler gear 160 in mesh with the central driving spur gear 116, and a second idler gear 162, supported between the projecting portions 134 and 136 of the plates 122 and 124, and driven by the first idler gear 160. The idler gears 160 and 162 are mounted to rotate about pivots 164 and 166, respectively, carried by the plates 122 and 124 in a manner similar to that described in connection with gear 150 and its pivot 152. The idler gears 160 and 162 have the same number of teeth which, in the embodiment under discussion, is one-half that of the forward idler gear 150. In one practical example, the spur gear 116 is provided with 36 teeth, the forward idler gear 150 has 36 teeth and the reverse idler gears 160 and 162 a each have 18 teeth.

It will be appreciated that the transmission means described thus far provides a bidirectional output for a given direction of rotation of the lead screw shaft 14. If, for example, the lead screw shaft 14 is rotated clockwise (resulting in displacement of the table 10 to the left as viewed in FIG. 1), the forward idler gear 150 will turn in a counterclockwise direction. The idler gear 162, on the other hand, being driven through the first idler gear 160, will rotate in a clockwise direction. The reverse holds holds true for counterclockwise rotation of the lead screw shaft 14, which results in clockwise movement of the forward idler gear 150 and counterclockwise rotation of the idler gear 162.

The digital indicator or counter 108 may be a commercially available unit modified as necessary, in accordance with the ensuing description. In one practical example, a Series 433, four-wheel, resettable counter, manufactured by E.N.M. Company, Chicago, Ill., is employed. The counter 108 is driven by the transmission 114 through a clutch mechanism 170. The mechanism 170 comprises a forward clutch gear 172 in mesh with idler gear 150 and a reverse clutch gear 174 in mesh with idler gear 162. The gears 172 and 174 are mounted in face-to-face relationship and are cupped to define between them a cylindrically shaped chamber 176. Mounted inside the chamber 176 is a piston assembly 177 including a disc-shaped piston 178 disposed coaxially of the gears 172 and 174. The outer periphery of the piston 178 is provided with a circumferential groove 180 which receives a generally circular clutch spring 182, as best shown in FIG. 8. The spring 182 has a free end 183 and a hooked end 184, the latter being received by a radially oriented hole provided in the piston 186 to prevent relative rotational movement between the spring 182 and the piston 178. Absent any restraint placed upon the outer periphery of the spring 182, the unloaded spring tends to assume a generally spiral configuration with the free end 183 well out of the groove 180. It will be evident that the with the piston assembly 177 installed inside the cupped clutch gears 172 and 174, the spring 182 is biased outwardly against the wall of the chamber 176 to frictionally engage the chamber wall.

The piston 178 is securely mounted on a concentrically oriented spline 188 having a polygonal cross section, which, in the example shown, is hexagonal. As viewed in FIG. 7, the spline 188 projects from the piston 178 to the right through a central aperture 190 formed in the reverse clutch gear 174. The spline 188 is in turn mounted on a clutch drawbar 192 which extends between the forward and rear end walls 194 and 196, respectively, of the position indicator housing 102. The piston 178, spline 188 and clutch drawbar 192 are joined by brazing, for example, so that these elements form a single unit. At the forward end, the clutch drawbar 192 is journaled in a bearing 198 having a radially projecting shoulder 200 which spaces the forward clutch gear 172 from the forward end wall 194. The forward clutch gear 172 is mounted for rotation on the inner end of the bearing 198. The other end of the drawbar 192 is journaled in, and extends through, the rear end wall 196. A follower element 202, having a circumferential groove 204, is affixed to the rear extremity of the drawbar 192.

The number wheels of the counter 108 are driven by an input drive gear 206 having a hub 208 mounted on the spline 188. The inner surface of the hub 208 is shaped to conform to the geometry of the spline 188, in this case, hexagonal. In this way, in a manner well known, the spline 188 is axially slidable relative to the gear 206, but the gear 206 rotates with the spline 188. The gears 172, 174 and 206 are prevented from shifting longitudinally by a spacer tube 209 surrounding the clutch drawbar 192 and extending between the gear 206 and the rear wall 196.

The counter drive gear 106 engages a first pinion 210 of the counter 108. Pinion 210 directly drives the first number wheel 212 of the counter so that the number wheel 212 rotates in unison with one or the other clutch gear 172 or 174, depending upon the position of the drawbar 102. The gearing is such that for each revolution of the gear 206, the number wheel 212 rotates one complete revolution. The wheel 212, which is provided with the numerals 0—9 about its periphery, reads in .010-inch increments, as will be more fully described later. The second, third and fourth number wheels 214, 216 and 218, respectively, each having the numerals 0—9, inclusive, about its outer surface, are driven in incremental fashion through a geneva movement, the operation of which is well known, by corresponding pinions 220, 222 and 224, respectively, in 1:10 ratios. Thus, the second number wheel 214 reads in .1-inch increments, the third number wheel 216 indicates units of table displacement, and the fourth number wheel 218 shows tens of units of table displacement. The gears 210, 220 and 222 and 224 are mounted to freely rotate on a shaft 226, the rear end of which projects through an arcuate slot 228 formed in the rear end wall 196 of the housing 102 and through a reset lever hub 230 near the periphery thereof. Because the counter mechanism 108, that is, the device driven by counter input gear 206, comprises essentially a commercially available unit and operates in a manner understood by those skilled in the art, all of the details of the counter mechanism, for example, the geneva movement and the reset or zeroing mechanism, have not been shown, It will be understood, however, that the number of counter wheels, the drive ratios thereof, and other parameters of the counter, may be chosen as required for a particular installation and all of the alternatives falling within the scope of this invention are intended by be covered by the appended claims.

Referring now to FIGS. 7 and 10, the counterreversing and reset actuator mechanisms will now be described. The sidewall 234 of the indicator housing 102 is provided with a bore 236 which carries a reverse lever shaft 238. An eccentric pin 240 projects inwardly from the inner end of the shaft 238 and slidably engages the groove 204 in the follower 202. The shaft 238 is biased inwardly by a coil spring 242 surrounding the shaft 238. The spring 242 is interposed between the sidewall 234 of the indicator housing 102 and a snap ring 244 mounted on the shaft 238 adjacent the inner end thereof. The outer end of the shaft 238 projects from the housing 102 and is provided with a forwardly extending lever 246 biased, by the action of the spring 242, against the profiled surface of a tubular cam 248 mounted on the side of the indicator housing. The profiled surface of the cam includes, respectively, upper and lower detents 250 and 252, one or the other of which is engaged by the lever 246 to prevent rotation of the shaft 238.

The reset lever hub 230 pivots about a shaft 256 carried by the housing end wall 196 and terminates in a lever 257 extending outwardly through a slot 258 in the sidewall 234. The rear projecting extremity of the counter pinion shaft 226 receives one end of a spring 259, the other end of which engages a pin 260 fixed to the rear wall 196 of the indicator housing 102. The spring 259 biases the reset lever 257 in a clockwise direction to the downwardly directed position shown by the solid lines in FIG. 10. The limits of the angular movement of the reset lever 257 is determined by the height of the slot 258.

The detents 250 and 252 are angularly spaced and positioned so that with the reverse lever 246 in the lower detent 252, the clutch drawbar 192 and piston 178 of the clutch mechanism 170 assume the position shown in FIG. 7, with the clutch spring 28 182 engaging the forward clutch gear 172. Lead screw movement is thereby transmitted from gear 116, through the forward idler gear 150, the forward clutch gear 172, the clutch spring 182, the piston 178, the spline 188 and the counter drive gear 206. When the lead screw 14 is driven in the opposite direction, advancement of the counter (which is a unidirectional device) is effected by moving the reverse lever 246 up into detent 250. The eccentric pin 240, acting on the follower 202, thereby pulls the clutch drawbar 192 rearwardly to displace the piston 178 to a position within the reverse clutch gear 174. Motion from the lead screw 14 is now transmitted through the reverse idler gear train 158, the reverse clutch gear 174, the clutch spring 182, the piston 178, to the counter drive gear 206 via the spline 188.

The vernier device 110, which, in the example shown, indicates to the nearest .001 inch, will now be described with reference to FIGS. 3, 4, 5, 6, and 11, in particular. The vernier 110 comprises generally a vernier dial 170 and a vernier reference dial 272 positioned coaxially with respect to one another and the axis 13. The dial 270 is a ringlike structure including forwardly projecting annular flange 274 and a rearwardly projecting annular flange 276 having a beveled lip 278 which overlaps the outer surface of the drum 272. The vernier dial 270 may be fabricated of any suitable material including metal or plastic such as white nylon or Delrin or the like, Delrin being the registered trademark of E. I. du Pont de Nemours & Co. for thermoplastic, acetal resins characterized by the radical [—(—OCH$_2$—)$_n$]. The dial 270 is further provided with an annular recess 280 extending about the forwardly facing surface of the dial 270 and in slidable engagement with the rear face of the end cap 32. The dial 270 is biased against the end cap 32 by a ring-shaped spring 282, fabricated, for example, from phosphor bronze sheet. The spring 282 is fixed to the gear plate assembly 118 by the machine screws 144. The spring 282 is further provided with radially extending offset ears 284 for engaging the surface 286 of the vernier dial 270 and biasing the dial against the end cap 32. The minimize friction and permit the ears 284 to ride smoothly on the dial surface 286, the ears 284 may each be provided with a spherically shaped dimple 288 which forms the sole contact with the surface 286 of the dial 270.

Engraved on the beveled surface of the lip 178 is a bidirectional vernier scale 290 visible through window 106 and comprising a series of axially extending lines having major divisions extending from both sides of a central zero line and representing, in the example under discussion, .005-inch displacements. The scale extends two major divisions, or .010 inch, in each direction from the central zero line. Each major division is subdivided further into five increments, each representing .001 inch of table displacement.

Formed in the forward edge of the annular flange 274 of the dial 270 is a gear rack 292 subtending an arc of about 40°. The dial 270 is rotatable through this arc by a pinion 194 in mesh with the rack 292. The pinion 294, as shown in FIG. 4, is mounted on a shaft 296 journaled within a bushing 298 press fit in a radially extending bore formed in the end cap 32. A vernier index knob 300 is pinned to the outer end of the shaft 296 for manually rotating the vernier dial 270 in either direction to adjust the position of the scale 290 relative to the reference dial 272.

The forward annular flange 274 of the vernier dial 270 also has a recess 302 to provide clearance for the projecting portions 132, 134 and 136 of the gear plates 120, 122 and 124, as best shown in FIG. 4. The recess 302 extends for a sufficient angular distance on either side of the gear plate projections so as not to interfere with the rotation of the dial 270.

The vernier reference dial 272 cooperates with the vernier dial 270 to furnish the operator with a reading of table position to the nearest .001 inch. Like the dial 270, the reference dial 272 may be made of a metal or a plastic such as white nylon or Delrin or the like. The dial 272 is in the shape of an annulus, affixed to the bevel ring gear hub 72 just forward of the bevel ring gear 70. The dial 272 thus rotates with the lead screw shaft 14, the forward peripheral edge of the dial 272 being overlapped by the lip 278. The outer surface of the dial 272 is provided with a series of axially oriented, equally spaced reference lines 306 about the entire circumference, the interval between adjacent lines being equal to two major divisions (the equivalent of .010-inch table displacement) on the dial scale 290, for a total of 20 lines.

To describe the operation of the apparatus of the present invention, a typical milling machine procedure will be referred to. At the outset, it should be noted that the counter 108 advances when the counter input gear 206 is rotated in a clockwise direction, which will also be the direction of one of the contrarotating clutch gears 172 or 174 which has been selected by the clutch 170 to drive the counter. (The directions of rotation which are referred to are those viewed from the front of the table position indicator, that is, as viewed from right to left in the perspective of FIG. 1.) With a 2:1 ratio between the drive gear 116 and the contrarotating clutch gears 172 and 174, each revolution of the lead screw 14 results in two revolutions of the counter (the number of teeth on the counter input drive gear 206 being equal to the number of teeth on the first number wheel 212). Thus, with a decimal point 308 placed between the second and third number wheels 214 and 216, a single revolution of the lead screw 14 causes the reading 00.20 to appear in the window 104.

Assume now that a table movement of a 9.236 inches is required in the left-hand direction from an arbitrary zero or reference point. The table is first moved to the reference point. At the reference point, the lever 257 is pushed up to reset the counter 108 to zero and then released. The vernier dial indexing knob 300 is then rotated to bring major divisions of the scale 290 into alignment with the lines 306 on the drum 272. The reverse lever 246 is then pushed into the lower detent 252 so that clutch spring 182 of the clutch mechanism 170 engages the forward clutch gear 172. The lead screw 14 is now rotated in the clockwise direction until the number 9.23 appears in the counter window 104. The remaining .006 inch travel is measured by observing, in window 106, the displacement of the lines 306 on the reference dial 272 relative to the vernier scale 290.

Figure 13:
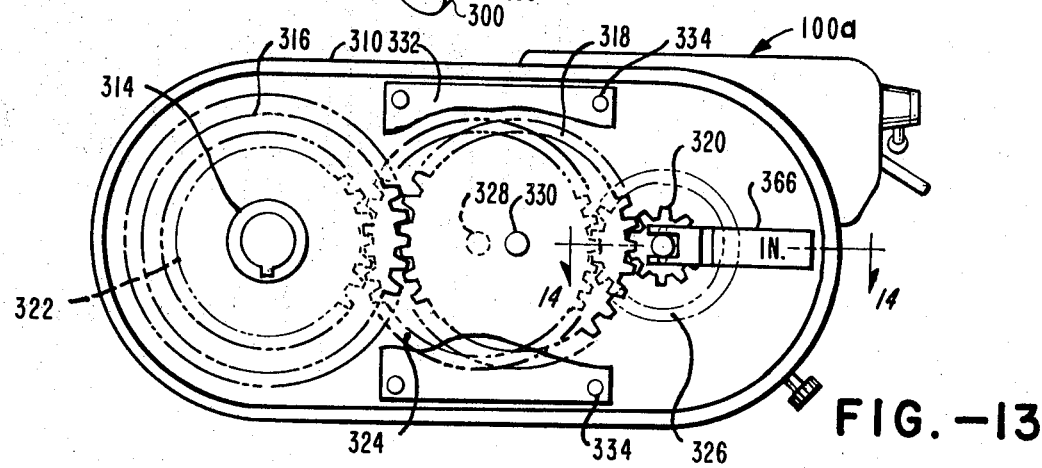
FIG. 13 is a front view of the drive mechanism of FIG. 12 with the front cover plate removed.
Figure 14:
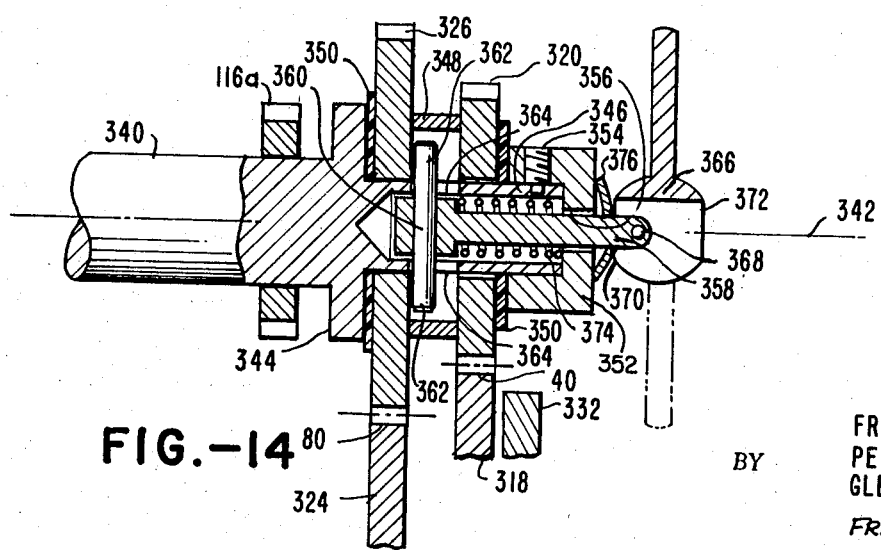
FIG. 14 is a section view of a portion of the device of FIG. 13 as taken along the plane 14–14.

FIGS. 12—14 show an alternative embodiment in which the displacement of a table 10a is indicated in either English or metric units. In the description which follows, elements having the same function as those in the embodiments already discussed will bear the same reference numeral followed by the letter a. The table position indicator 100a of the embodiment of FIGS. 12—14 reads both in inches to the nearest .001 inch and in millimeters with an accuracy to .01 millimeters. The table position indicator drive mechanism is essentially the same as the gear plate transmission 114 already discussed. The elements and operation of the vernier device is also basically the same as the device 110. The major difference is that the indicator housing 102a is offset from the axis 13a of the lead screw shaft 14a to accommodate, in an interconnecting transmission case 310, appropriate gearing and clutch arrangement. Also, the window 106a is provided with two decimal points 308a and 311, the former being located between the second and third number wheels for the English reading and the latter being positioned between the third and fourth number wheels for the metric reading.

Although the unit depicted in FIG. 12 is oriented horizontally, it will be appreciated that with minor modifications in the placement of the indicator housing 102a to facilitate viewing of windows 104a and 106a, the unit may be positioned vertically or at some angle between the horizontal and vertical, as may be desired for a particular installation.

The transmission case 310 has a front cover plate 312 which is removable to gain access to the interior without having to remove the unit from the machine tool. With the cover plate 312 removed, as shown in FIG. 13, two parallel gear trains, both driven continuously by a hub 314 keyed to the lead screw shaft 14a, are exposed. The first train, for providing the metric unit indication, comprises a drive gear 316 mounted on the hub 314, an intermediate gear 318 and driven gear 320. The second or English gear train includes a drive gear 322, mounted on the hub 314 concentrically with the gear 316, an intermediate gear 324 and a driven gear 326 mounted coaxially with the gear 320, as will be described. The intermediate gear 324 of the English gear train is rotatable mounted on a suitable stub axle 328 carried by the rear wall of the case 310. The intermediate gear 318 is rotatable carried on a stub axle 330 projecting rearwardly from a plate 332 suitably mounted by fasteners 334 and positioned adjacent the front cover plate 32 312.

Turning to FIG. 14, the counter and vernier mechanisms of the table position indicator 100a are driven by a shaft 340 whose longitudinal axis 342 is parallel to the lead screw axis 13a. A spur gear 116a fastened to the shaft 340 provides the same function as the gear 116 in the embodiment previously described, in that it drives a gear plate transmission to the counter. The shaft 340 is further provided with a transverse flange 344 and a tubular portion 346 extending forwardly from the flange 344. The gears 320 and 326 are mounted for fee rotation on the tube 346 and separated by a spacer ring 348 interposed between the gears. The forward surface of the gear 320 and the rear surface of the gear 326 are each coated with a high friction clutch material 350. The front end of the tube 346 is covered by a cap 352 securely attached to the tube 346 by a screw 354 and having a central aperture 356 with a diameter smaller than the inside diameter of the tube 346. Disposed generally coaxially within the tube 346 is an arm 348, the inner end of which carries a pin 360 oriented transversely of the axis 342 and having ends 362 projecting through slots 364 formed in the wall of tube 346. The pin ends 362 emerge from the tube 346 between the gears 320 and 326, the diameter of the pin 360 being slightly smaller than the distance separating the gears 320 and 326 as determined by the spacer ring 348. The arm 358 projects forwardly through the aperture 356 and is pivotally connected to a cam lever 366 at the point 368. It will be noted that one surface 370 of the cam lever 366 is closer to the pivot point 368 than the opposite surface 372.

Surrounding the arm 358 is a coil spring 374 extending between the cap 352 and pin 360 and which tends to bias the arm and pin rearwardly toward gear 326. A spring washer 376, having a higher spring rate than the coil spring 374, disposed about the arm 358 between the cap 352 and the cam lever 366, tends to oppose the action of the coil spring 374.

In operation, with the cam lever 366 in the slack position shown, the spring washer 376 is undeflected and the pin 360 bears against the forward surface of the gear 326 under the force of coil spring 374 and thereby biases the frictional surface of gear 326 against the flange 344. Motion is thus transmitted through the English system gear train to the shaft 340. To drive the counter mechanism through the metric gear train, the cam lever 366 is moved 180° to the position shown by the broken lines in FIG. 14. Because of the greater distance between the pivot point 368 and the surface 372, the pin 360 is urged away from the gear 326 and against the rear surface of the gear 320, forcing this gear into frictional engagement with the cap 352. This is made possible because the resisting force of the stiffer spring washer 376 overcomes the biasing force of the coil spring 374. The motion of the lead screw shaft 14a is thereby transmitted through the metric gear train and the cap 352 to the shaft 340.

The gear ratios required for a particular application will be evident to those skilled in the art. By way of example, assume that the pitch of the lead screw is such that one revolution provides a table movement of .250 inch (6.35 mm.) Because of the 2:1 ratio of the teeth on counter transmission input gear 116a to the teeth on the counter input gear 206a, to obtain indications in the English system, a tooth ratio of 5:4 must be provided between the lead screw shaft 14a and the indicator drive shaft 340. In one practical example, this ratio is obtained by using a 100-tooth gear as the drive gear 322 an and an 80-tooth gear as the driven gear 326. In this example, the intermediate idler gear 324 has 102 teeth. For the metric reading, a ratio of 3.175:1 must be provided between the drive and driven gears. Thus, in the practical example under discussion, the drive gear 316 has 127 teeth and the driven gear 320 has 40 teeth. The intermediate idler 318 has 109 teeth although this, of course, does not affect the overall ratio.

Although various modifications might be suggested by those skilled in the art, it should be understood that it is intended to embody within the scope of the patent all such embodiments as reasonably and properly come within the scope of the contribution to the art.

We claim:

1. Apparatus for indicating the position of a member movable in response to a bidirectionally rotatable drive mechanism, comprising:
   a resettable counter for providing a coarse, digital indication of accumulated displacement of the member in either direction from a zero point;
   a transmission coupled to be driven by the drive mechanism, the transmission having a first output movable in a given direction when the drive mechanism is rotated clockwise and a second output movable in said given direction when the drive mechanism is rotated counterclockwise;
   clutch means coupling said counter and transmission and selectively movable to engage one or the other of the transmission outputs to advance the counter during rotation of the drive mechanism;
   a first, rotatable dial coupled to the drive mechanism for rotation therewith, said first element having a peripheral surface provided with circumferentially spaced reference markings;
   a second dial having a peripheral surface disposed adjacent the peripheral surface of the first dial and provided with a bidirectional vernier scale; and
   means for manually controlling the position of the second dial whereby the markings on the surface of the second dial may be brought into alignment with the markings on the surface of the first dial.

2. Apparatus, as defined in claim 1, in which said transmission outputs comprise a pair of contrarotatable gears, each gear having a surface adapted to be frictionally engaged by the clutch means.

3. Apparatus, as defined in claim 2, in which:

said output gears are mounted in face-to-face, coaxial relation and cupped to define a cylindrical chamber; and said clutch means includes:

a disc-shaped piston coaxially disposed within the cylindrical chamber and mounted on a reciprocable drawbar means coupled to drive the counter, and means supported by the periphery of the piston for frictionally engaging the chamber wall of one or the other output gear in accordance with the selected position of the drawbar means, whereby motion is transmitted from one or the other output gear, through the frictional gear-engaging means and the piston to the drawbar means.

4. Apparatus, as defined in claim 1, which includes gear train means connecting the rotatable drive mechanism with the transmission and the first dial for converting displacement of the member in terms of the English measuring system to indications of displacement in metric units.

5. Apparatus, as defined in claim 4, in which said gear train means comprises first and second gear trains, the drive ratio of the first train providing indications in English units, the drive ratio of the second train providing indications in metric units, said apparatus further including clutch means cooperating with the gear trains and selectively operable to drive the transmission and first dial with either the first or second gear train.

6. In a machine tool having a bidirectional lead screw drive for displacing a table carrying the work piece to be formed, a table position indicator comprising:

a resettable counter having four rotatable, decade number wheels for providing a coarse, digital indication of table displacement from an arbitrary zero point, the first number wheel being directly driven with a 1:1 ratio by a counter input gear, the remaining three number wheels being intermittently rotatable by a succession of geneva movements with 10:1 ratios;

gear transmission means coupling the lead screw drive with the counter input gear, the transmission means including a dual gear train having a pair of contrarotating, abutting output gears coaxial with each and the counter input gear, both output gears being recessed from their abutting faces to define a cylindrical chamber;

a clutch mechanism including:

a disc-shaped piston disposed within the cylindrical chamber coaxially therewith, the piston having a circumferential groove, a generally ring-shaped spring seated within the groove and having one end connected to the piston to prevent rotation of the spring relative to the piston, and a free end which tends to move outwardly from the groove, said spring being restrained from outward expansion by the walls of the cylindrical chamber to provide a frictional coupling between the output gears and the piston, a drawbar, extending coaxially of the output gears, affixed to the piston and reciprocably mounted to axially position the piston and spring within the chamber to engage one or the other output gear, a spline, affixed to the drawbar and slidably engaged with the counter input gear, for transmitting rotational motion from the piston to the counter input gear, and manually actuable cam means, coupled to the drawbar, for reciprocating the drawbar, whereby the transmission output gear to drive the counter is selected; and a vernier indicator, comprising:

a first dial, coupled to be driven by the lead screw and having a peripheral surface provided with reference markings including axially oriented lines spaced circumferentially about the peripheral surface at equal intervals, a second dial, concentric with the first dial, having a peripheral surface adjacent the peripheral surface of the first dial, the peripheral surface of the second dial being provided with a bidirectional vernier scale for cooperation with the reference markings on the first dial, and rack and pinion means for manually adjusting the angular position of the second dial.

7. A table position indicator, as defined in claim 6, in which said gear transmission means includes an English-to-metric conversion gear train coupling the lead screw with the dual gear train and the first dial, whereby the table position indicator reads in metric units.

8. Apparatus for accurately positioning a member connected to be displaced by a bidirectionally rotatable drive means, comprising:

a first cylindrical member concentrically mounted on the drive means to rotate therewith and having an outer surface provided with a series of equally spaced, axially oriented reference lines;

a second cylindrical member mounted coaxially of the first cylindrical member, the second member having an outer surface disposed immediately adjacent the outer surface of the first member and provided with a bidirectional vernier scale extending on each side of a zero line a distance equal to the distance between adjacent reference lines on the first member; and means for displacing the second member angularly between limits including an arcuate gear rack formed in the second member and a manually rotatable pinion means in mesh with the rack.

9. Apparatus for indicating the displacement of a member bidirectionally movable in response to rotation of a drive means, including:

a resettable counter for displaying the accumulated displacement of the member in either direction from a reference;

gear train means coupled to the drive means and having counterrotatable outputs;

coupling means, selectively operable to connect one or the other of the gear train outputs with the counter to advance the counter during rotation of the drive means; and vernier means for providing fine indications of displacement comprising:

a first dial connected to be driven by the drive means and having an outer surface with a series of equally spaced markings, and a second dial having an outer surface disposed adjacent to the outer surface of the first dial and having a series of markings forming a vernier scale, said second dial being selectively positionable to permit alignment of the markings on the second dial with the markings on the first dial.